(12) United States Patent
Kobayashi et al.

(10) Patent No.: US 7,620,036 B2
(45) Date of Patent: Nov. 17, 2009

(54) IP TELEPHONE SYSTEM AND CALLING METHOD

(75) Inventors: Kazuto Kobayashi, Kanagawa (JP); Akira Miyajima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1016 days.

(21) Appl. No.: 11/184,899

(22) Filed: Jul. 20, 2005

(65) Prior Publication Data

US 2006/0029045 A1    Feb. 9, 2006

(30) Foreign Application Priority Data

Aug. 4, 2004    (JP) .............................. 2004-228655

(51) Int. Cl.
*H04L 12/66* (2006.01)

(52) U.S. Cl. .................. 370/352; 370/389; 370/392; 379/900

(58) Field of Classification Search .................. 370/352, 370/389, 392; 379/201.01–201.08
See application file for complete search history.

(56) References Cited

U.S. PATENT DOCUMENTS

| 6,845,096 B1 | 1/2005 | Hori et al. |
| 2003/0074461 A1 | 4/2003 | Kang et al. |

FOREIGN PATENT DOCUMENTS

| JP | 10-322465 A | 12/1998 |
| JP | 2003-125099 A | 4/2003 |
| KR | 2001-0079272 | 8/2001 |
| KR | 2001/0079272 | * 8/2001 |
| KR | 2004-0028333 | 4/2004 |

OTHER PUBLICATIONS

English Language Abstract of 2004-0028333.
English Language Abstract of 2001-0079272.
A publication issued by ENUM Trial Japan "ENUM Trial Japan First Report", May 2004, together with a partial English translation of the same.
U.S. Appl. No. 11/082,795 to Kaizawa et al., which was filed Mar. 18, 2005.
U.S. Appl. No. 11/082,796 to Kaizawa et al., which was filed Mar. 18, 2005.
U.S. Appl. No. 11/150,111 to Kobayashi et al., which was filed Jun. 13, 2005.
U.S. Appl. No. 11/150,117 to Kobayashi et al., which was filed Jun. 13, 2005.
U.S. Appl. No. 11/150,119 to Kobayashi et al., which was filed Jun. 13, 2005.

(Continued)

*Primary Examiner*—Curtis Kuntz
*Assistant Examiner*—Yosef K Laekemariam
(74) *Attorney, Agent, or Firm*—Greenblum & Bernstein P.L.C.

(57) ABSTRACT

When a call recipient name is clicked on a search result screen of a phonebook search system, an ENUM server is notified of an html file name which displays the call recipient profile, which is personal data. The ENUM server extracts a URI corresponding to an IP telephone service for the call recipient from a NAPTR record based on the html file name, and transmits the URI to a source IP telephone apparatus. The source IP telephone apparatus then becomes able to place a call to a destination IP telephone apparatus, using the URI corresponding to the IP telephone service for the call recipient.

8 Claims, 15 Drawing Sheets

OTHER PUBLICATIONS

U.S. Appl. No. 11/166,236 to Kobayashi et al., which was filed Jun. 27, 2005.
U.S. Appl. No. 11/183,955 to Kobayashi et al., which was filed Jul. 19, 2005.
U.S. Appl. No. 11/183,963 to Kobayashi et al., which was filed Jul. 19, 2005.
U.S. Appl. No. 11/183,988 to Kobayashi et al., which was filed Jul. 19, 2005.
U.S. Appl. No. 11/195,817 to Kobayashi et al., which was filed Aug. 3, 2005.
Faltstrom et al., "The E.164 to Uniform Resource Identifiers (URI) Dynamic Delegation Discovery System (DDDS) Application (ENUM)," IETF Standard, Internet Engineering Task Force, IETF, CH, Apr. 2004, XP015009541.
Mealling et al., "The Naming Authority Pointer (NAPTR) DNS Resource Record," Internet Citation, [Online] Sep. 2000, XP002237947, Retrieved from the Internet: URL:http://www.faqs.org/rfcs/rfc2915.html (retrieved on Apr. 10, 2003).
English language Abstract of JP 2003-125099 A, Apr. 25, 2003.
English language Abstract of JP 10-322465 A, Dec. 4, 1998.

* cited by examiner

Fig.5

| Enum domain name | | Order | Preference | Flags | Service | | URI scheme | |
|---|---|---|---|---|---|---|---|---|
| | | | | | | | | URI |
| 0.0.0.0.0.0.1.3.1.8.e164.arpa | IN NAPTR | 100 | 10 | "u" | "E2U+sip" | "!^.*.$!sip" | 05011112222@tokyo.sip.jp | |
| | IN NAPTR | 100 | 10 | "u" | "E2U+http" | "!^.*.$!http" | //www.tokyo.sip.com/useraaa.html | |
| 1.0.0.0.0.0.0.1.3.1.8.e164.arpa | IN NAPTR | 100 | 10 | "u" | "E2U+sip" | "!^.*.$!sip" | 05033334444@tokyo.sip.jp | |
| | IN NAPTR | 100 | 10 | "u" | "E2U+http" | "!^.*.$!http" | //www.tokyo.sip.com/userbbb.html | |

NAPTR resource record

Fig.7

"//www.tokyo.sip.com/user aaa.html"

Personal data

Search condition : Search keyword ("Tokkyo" "Taro")
Search result : Display one of one

| Name | Title | Address ····· | | Group | |
|---|---|---|---|---|---|
| | | | | Post NO | E-mail |
| Tokkyo Taro | S K G | ××××Co., Ltd. | | | |
| | | OO ken △△shi ××× | | ××-000 | |

Display one result

| User ID | Password | IP address(IP telephone apparatus) or URI |
|---------|----------|-------------------------------------------|
| 1234 | ××△△ | 192.168.1.1 |
| ⋮ | ⋮ | ⋮ |

Fig.14

INVITE sip:10000001@voip.ne.jp SIP/2.0
Via:SIP/2.0/UDP@voip.ne.jp:5060;branch=721e418c4.1
From:sip:05033334444@tokyo.sip.jp
To:sip:05011112222@tokyo.sip.jp,tag=1111

IP TELEPHONE SYSTEM AND CALLING METHOD

BACKGROUND OF THE INVENTION

1. Field of the Invention

The present invention relates to an IP telephone system, and a calling method by the IP telephone system that perform communication via an IP network.

2. Description of Related Art

The recent rapid growth of the Internet has drawn attention to an IP telephone system that enables low-cost voice communications with telephone apparatuses at remote places as well as free voice communications between IP telephone apparatuses owned by subscribers. It is also known that, when a PSTN (Public Switched Telephone Network) telephone apparatus connected to a conventional PSTN places a call to an IP telephone apparatus, a telephone number which begins with "050" is dialed.

Recently, ENUM technology has drawn attention due to its ability to effectively manage information used for various communications methods including telephones, facsimiles, cellular phones and electronic mail, and to enable various communication according to individual circumstances. ENUM is designed to identify the Internet service with a unique global identification number such as the E.164 number, using the DNS (Domain Name System). Currently, the IETF (Internet Engineering Task force) is seeking to standardize ENUM platforms, where protocol specifications are discussed (See Publication 1, for example).

[Publication 1] Issued by ENUM Trial Japan "ENUM Trial Japan First Report" May, 2004

When dialing a telephone number beginning with "050" using the ENUM system, however, a user needs to input a telephone number at an IP telephone. However, the user is unable to input a telephone number using a telephone number search system that enables the user to search a telephone number via a PC.

SUMMARY OF THE INVENTION

The present invention is provided to address the above-described problems. The purpose of the present invention is to provide an IP telephone system and a calling method by the IP telephone system that can place an automatic call by simply clicking, for example, a name of another IP telephone apparatus searched by a telephone number search system, the telephone number search system being capable of searching a telephone number.

In the present invention, an IP telephone apparatus accesses personal information stored on a Web server, extracts all the information or part of the personal information and displays the personal data at the IP telephone apparatus. The IP telephone apparatus adds an html text file name used for the displayed personal data by clicking the personal data displayed on the IP telephone apparatus. The IP telephone apparatus then transmits, to an ENUM server, a request for a URI corresponding to an IP telephone service or for a telephone number contained in the URI. The IP telephone apparatus receives the URI corresponding to the IP telephone service or the telephone number contained in the URI, which was searched by the ENUM server based on the html text file name, and transmits, to the IP network, a message requesting a call connection by specifying the telephone number, the telephone number being received by the IP telephone apparatus as a telephone number of another IP telephone apparatus.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 5 illustrates an example of a NAPTR record stored in a DB of the ENUM server according to the embodiment;

FIG. 7 illustrates a display example of personal data;

FIG. 8 illustrates a configuration describing authentication data stored on the Web server;

FIG. 14 illustrates an example of the "INVITE" message; and

DETAILED DESCRIPTION OF PREFERRED EMBODIMENTS

The embodiments of the present invention are explained in the following, in reference to the above-described drawings.

Figure 1:
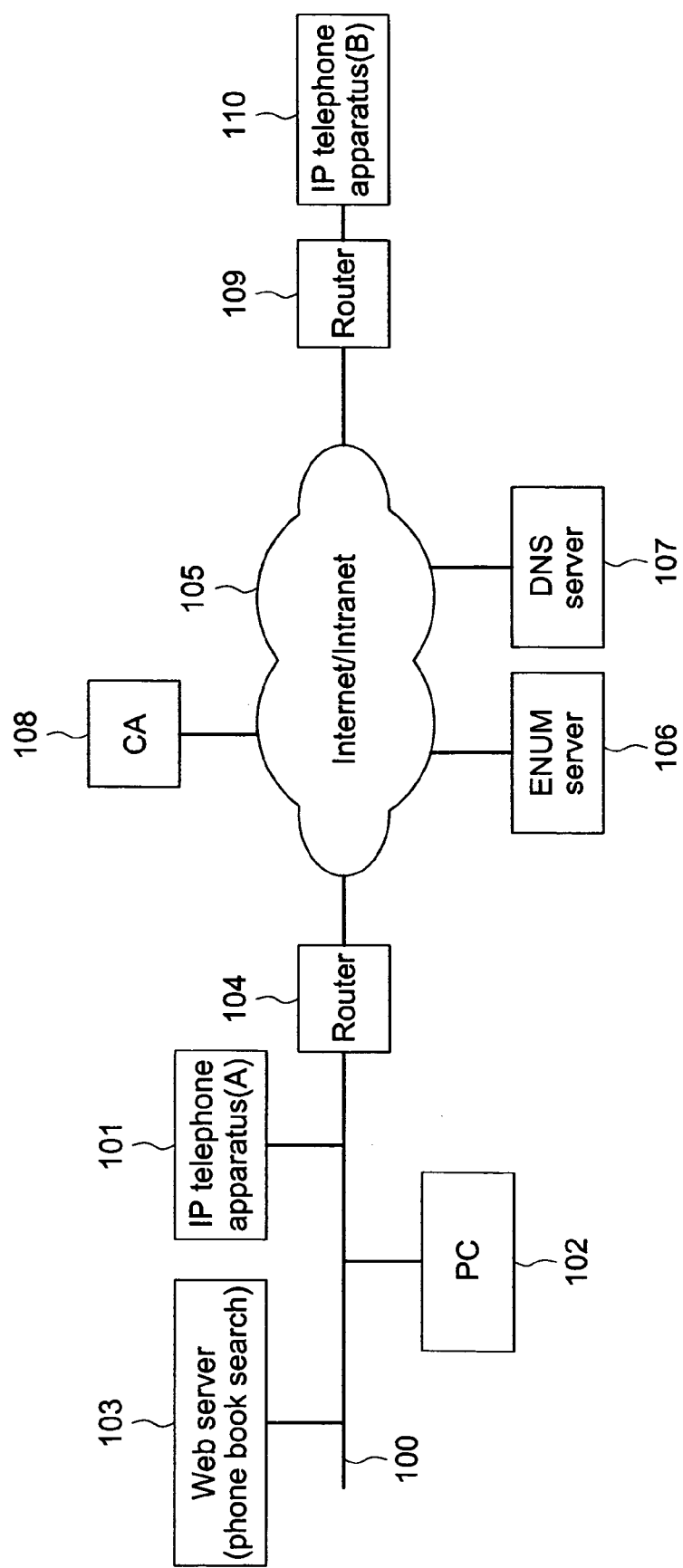
FIG. 1 illustrates a network configuration of an IP telephone system according to an embodiment of the present invention.

FIG. 1 illustrates a network configuration according to the present embodiment. IP telephone apparatus (A) 101, PC (Personal Computer) 102, Web server 103 or the like are provided within local network 100. Local network 100 is connected to Internet/Intranet 105 via router 104. On Internet/Intranet 105, ENUM server 106, DNS server 107, CA (Call Agent) server 108 are in operation. In addition, another IP telephone apparatus (B) 110 may be connected to Internet/Intranet 105 via router 109.

This network configuration simply shows one example. For example, DNS server 107 and CA server 108 may not be used in another network. Also, the location of each communication device is not limited to the above description. ENUM server 106, DNS server 107 and CA server 108 are shown as an example. The configuration may include a plurality of apparatuses connected to each other so as to provide a function which is described later.

IP telephone apparatuses (A) 101 and (B) 110 have the same functions that enable voice communication with another IP telephone apparatus connected via Internet/intranet 105.

ENUM (Telephone Number Mapping) server 106 is equipped with a database (DB) that stores a NAPTR (The Naming Authority Pointer) resource record (hereafter referred to as "NAPTR record"), which is described later. ENUM server 106 transmits, to IP telephone apparatus (A) 101 (110), the NAPTR record stored in the DB in response to a query (hereafter referred to as "ENUM query") from IP telephone apparatus (A) 101 (110). In the specification, ENUM is used as a general term describing a system that searches ENUM DNS (ENUM server) based on a predetermined number (including an electronic communication number) and obtains one or a plurality of applications in a URI form, the application being applicable in relation to the predetermined number.

DNS (Domain Name System) server 107 is equipped with a DB that stores a domain name (including a URI {Uniform Resource Identifier}) specified in the NAPTR record and stores an IP address corresponding to the domain name. DNS server 107 transmits, to IP telephone apparatus (A) 101 (110), the IP address stored in the DB in response to a query from IP telephone apparatus (A) 101 (110).

CA server 108 controls a call control between IP telephone apparatuses (A) 101 and (B) 110 connected to local network (IP network) 100. CA server 108 controls a call connection with a destination IP telephone apparatus in response to a call connection request from a source IP telephone apparatus. DNS server 107 is not required when CA server 108 controls a call connection.

Figure 2:
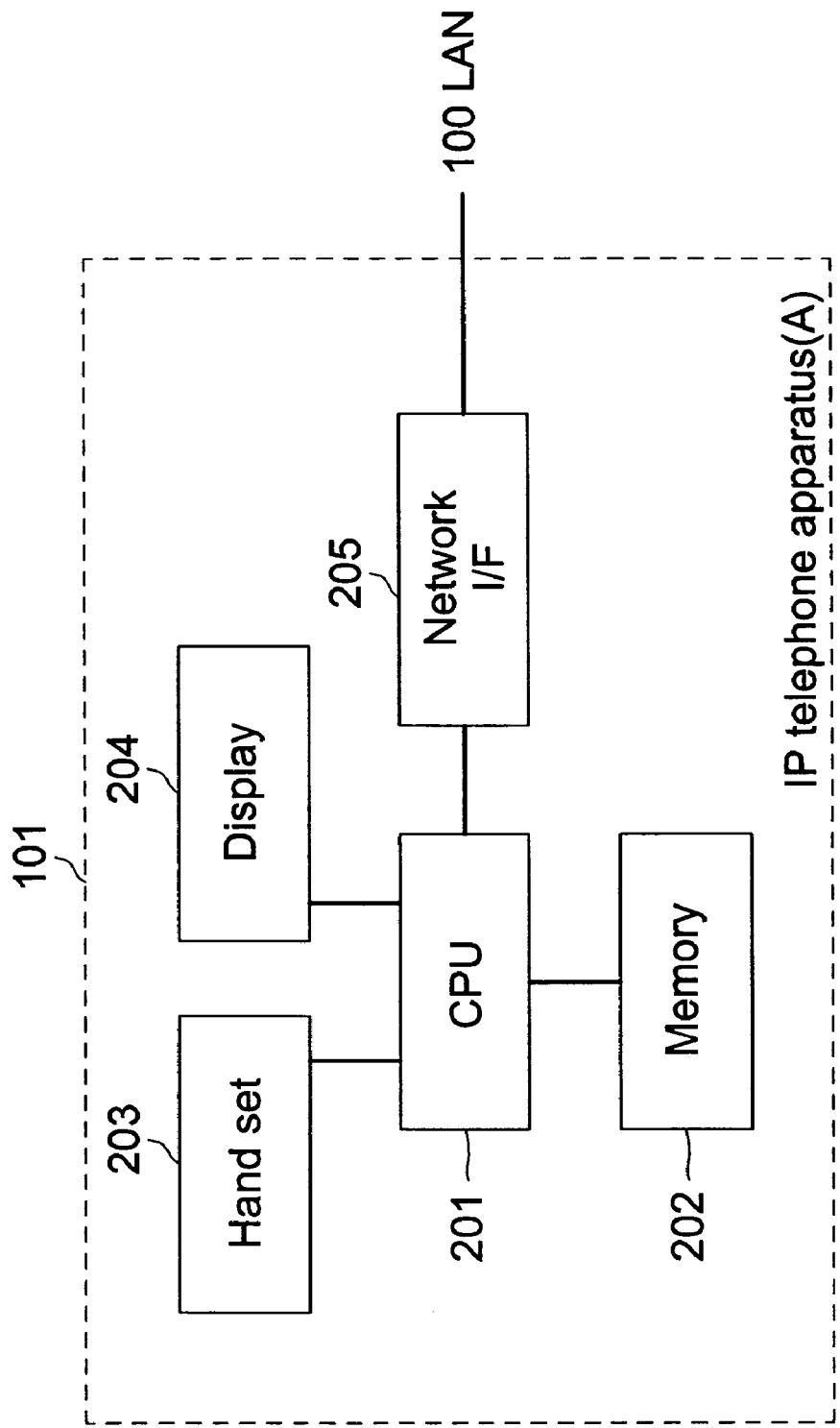
FIG. 2 illustrates a block diagram describing a configuration of an IP telephone apparatus according to the embodiment.

FIG. 2 illustrates a block diagram describing a hardware configuration of IP telephone apparatus (A) 101. IP telephone apparatus (A) 101 is mainly configured with CPU 201, memory 202, handset 203, display 204 and network interface (hereafter referred to network I/F) 205.

CPU 201 controls all operations needed to perform voice communication with another IP telephone apparatus (B) 110 via Internet/Intranet 105, which is an IP network, based on a voice communication control program stored in memory 202. CPU 201 performs, for example, a communication control utilizing the IP network, a call control via the IP network and a voice processing control. Call controls are represented by SIP (Session Initial Protocol) and H.323. CPU 201 also displays necessary information on display 204 and performs IP communication via network I/F 205. IP communication is designed to, for example, transmit to ENUM server 106 a query (hereafter referred to as "ENUM query") for a NAPTR record corresponding to a destination terminal, receive a response (hereafter referred to as "ENUM response") to the ENUM query, transmit to DNS server 107 a query (hereafter referred to as "IP address query") for an IP address and control reception of a response (hereafter referred to as "IP address response") to the IP address query.

Memory 202 is configured with a ROM (Read Only Memory) and a RAM (Random Access Memory). The ROM stores a voice communication control program or the like executed by CPU 201. The RAM is used as a work memory when CPU 201 executes the program.

Handset 203 is used to output an on-or-off hook signal to CPU 201 according to a user's on-or-off hook operation. Handset 203 is configured with a microphone and a speaker. Handset 203 converts the user's transmitting voice, through the microphone, into the transmitting voice signal, when starting communication with the destination terminal. At the same time, handset 203 outputs, through the speaker, the receiving voice signal input from CPU 201 as the receiving voice.

Display 204 is configured with an LCD (Liquid Crystal Display) or the like and displays the current status of IP telephone apparatus (A) 101. Display 204 also displays a telephone number or the like input by CPU 201.

Network I/F 205 is an interface for local network (IP network) 100 to which IP telephone apparatus 101 is connected. Network I/F 205 functions as a transmitter and a receiver.

Figure 3:
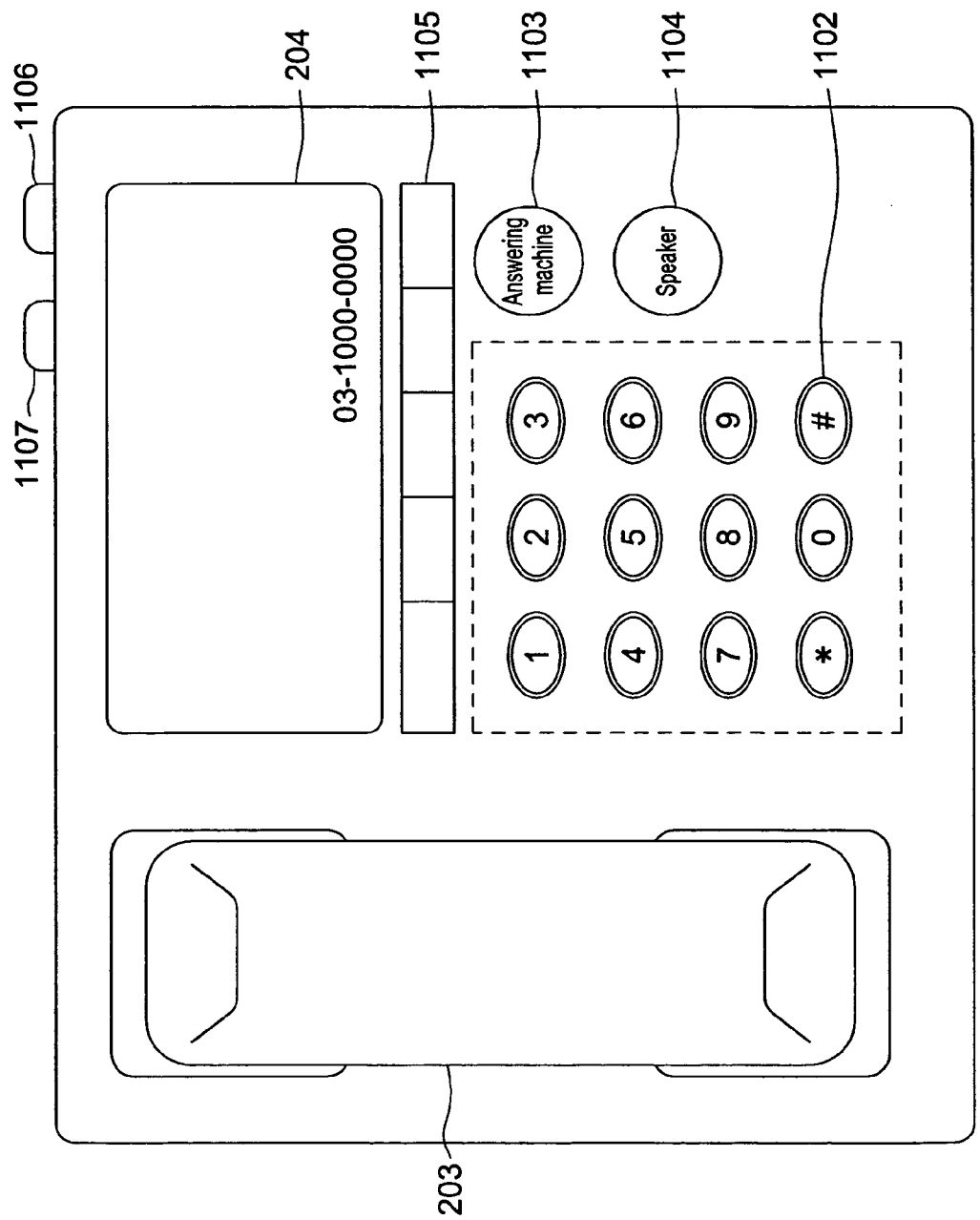
FIG. 3 illustrates a front view of the appearance of the IP telephone apparatus shown in FIG. 2.

FIG. 3 illustrates a front view of IP telephone apparatus (A) 101. IP telephone apparatus (A) 101 is configured with handset 203, display 204, numerical keys 1102, AM (Answering Machine) button 1103, speaker button 1104, and function button 1105. Numerical keys 1102 is used to enter a telephone number or the like. AM button 1103 is used to switch to the answering machine mode. Speaker button 1104 is used to switch the mode to the external output voice. Function button 1105 is able to set various functions such as a single touch transmission function. IP telephone apparatus (A) 101 further includes, on its side, LAN interface (LAN I/F) 1106 to be connected to local network 100 and includes public line interface (public line I/F) 1107 to be connected to a PSTN (Public Switched Telephone Network).

Figure 4:
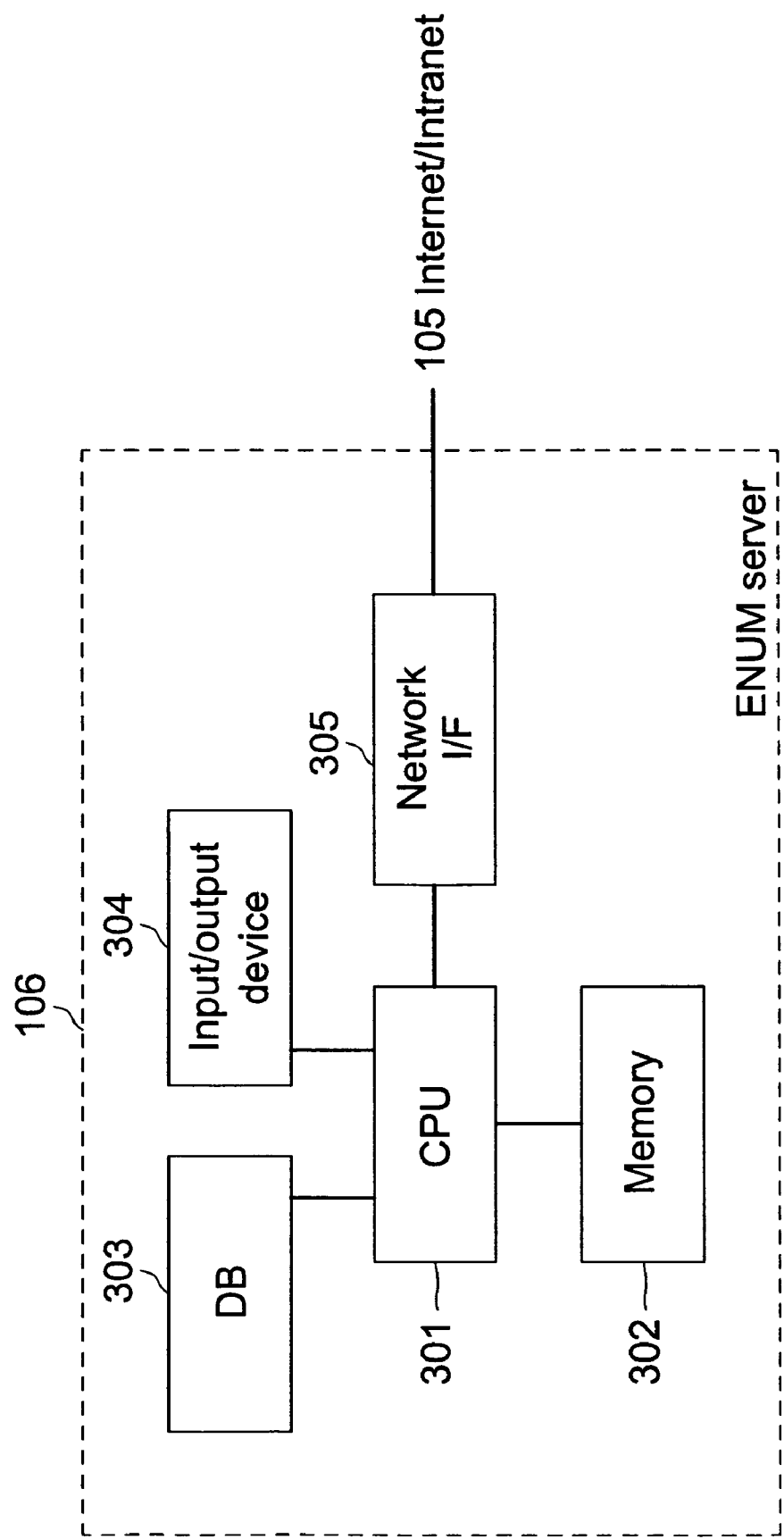
FIG. 4 illustrates a block diagram describing a configuration of an ENUM server according to the embodiment.

FIG. 4 illustrates a block diagram describing a configuration of ENUM server 106. ENUM server 106 is mainly configured with CPU 301, memory 302, DB 303, input/output device 304 and network I/F 305.

CPU 301 controls the entire operation of ENUM server 106 based on the control program stored in memory 302. Upon receiving an ENUM query (inquiry) from IP telephone apparatus (A) 101, for example, CPU 301 searches for a NAPTR record corresponding to the ENUM query from the data stored in DB 303, which is described later, and transmits the NAPTR record to IP telephone apparatus (A) 101 that has transmitted the ENUM query. In the present embodiment, it is possible to use a reversed NATRA query transmitted from Web server (described later).

Memory 302 may be configured with a ROM and a RAM. The ROM stores the control program executed by CPU 301. The RAM is used as a work memory when CPU 301 executes the program.

DB 303, which is configured with a hard disk device or the like, stores the above-noted NAPTR record. FIG. 5 illustrates an example of the NAPTR record stored in DB 303. The example shows that DB 303 stores the NAPTR record corresponding to domain name "0.0.0.0.0.0.0.1.3.1.8.e164.arpa" obtained from telephone number "0310000000", and the NAPTR record corresponding to domain name "1.0.0.0.0.0.0.1.3.1.8.e164.arpa" obtained from telephone number "0310000001". Particularly, DB 303 stores a call recipient profile html. For example, for the user who has a URI including telephone number "0310000000", html file "//www.tokyo.sip.com/useraaa.html" is stored. When a corresponding icon is clicked on the browser, Web server 103 transmits a reversed NAPTR query based on the call recipient profile html.

In this example, a reversed NAPTR query indicates a query for a telephone number URI stored in connection with a call recipient ENUM domain name, the domain name being reversely obtained from the URI. In response to the reversed NAPTR query, ENUM server 106 first searches the DB storing the NAPTR record, and retrieves the ENUM domain name corresponding to the URI, based on the call recipient profile html file name (URI). ENUM server 106 then transmits the extracted telephone number URI (050 system number), the URI being stored in connection with the retrieved ENUM domain name. In the example shown in FIG. 5, an html file name such as "//www.tokyo.sip.com/useraaa.html" is designated and used for the reversed NAPTR query. "0.0.0.0.0.0.0.1.3.1.8.e164.arpa" is reversely obtained as the call recipient ENUM domain name. Telephone number URI "05011112222@tokyo.sip.jp" is stored in connection with the call recipient ENUM domain name.

Input/output device 304 is configured with an input device such as a keyboard and an output device such as a display. The input device is used for the maintenance of ENUM server 106. The output device is used to display the maintenance information. Network I/F 305 is an interface for Internet/intranet 105 to which ENUM server 106 is connected.

Figure 6:
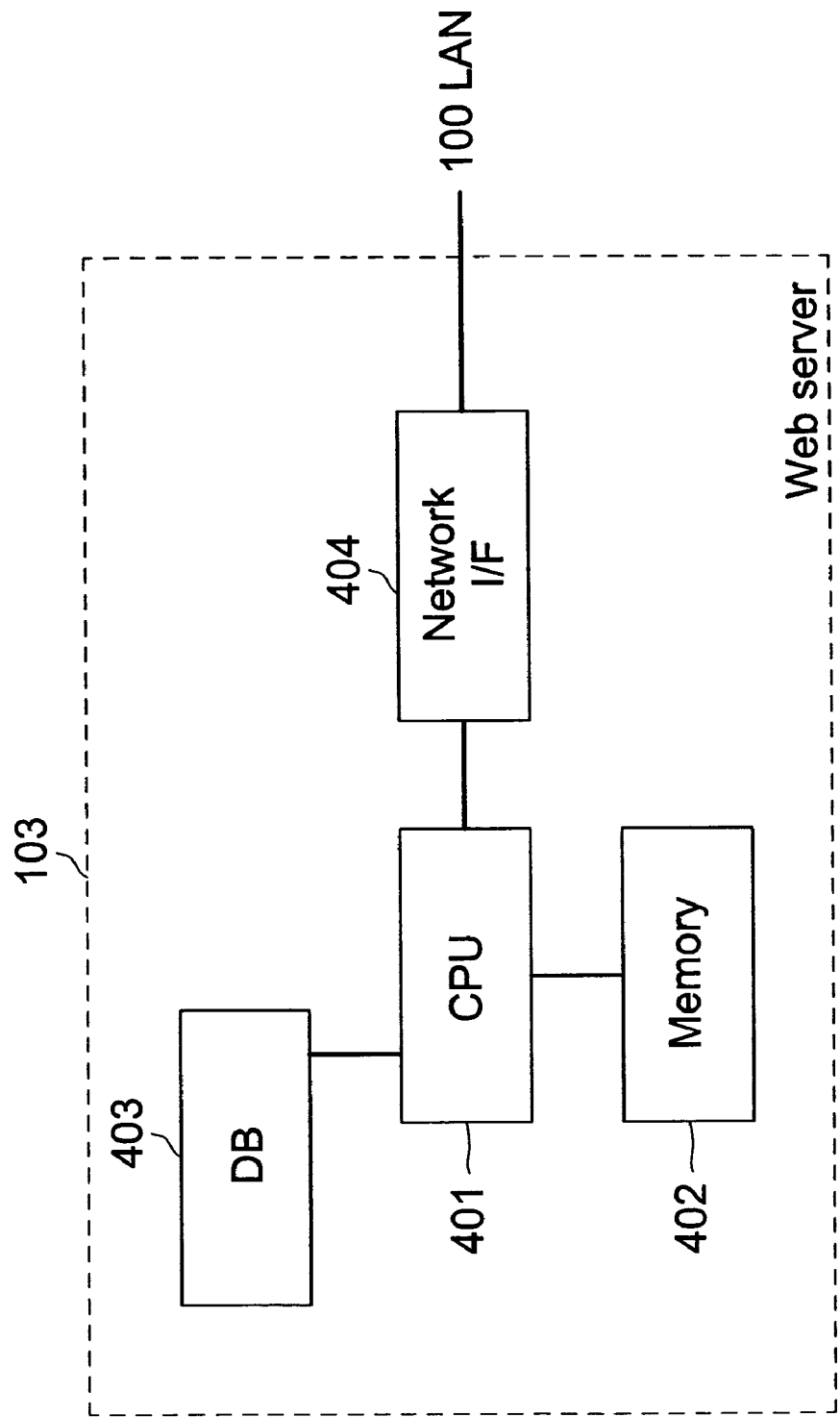
FIG. 6 illustrates a block diagram describing a configuration of a Web server according to the embodiment.

FIG. 6 illustrates a block diagram describing a configuration of Web server 103. Web server 103 is mainly configured with CPU 401, memory 402, DB 403 and network I/F 404.

CPU 401 controls the entire operation of Web server 103 based on the control program stored in memory 402. Upon receiving a phonebook search request from PC 102, CPU 401 searches for the call recipient profile html from phonebook data stored in DB 403 (described later), and transmits the profile html to PC 102 that has transmitted the request.

Memory 402 may be configured with a ROM and a RAM. The ROM stores a control program executed by CPU 401. The RAM is used as a work memory when CPU 401 executes the program.

DB 403, which is configured with a high-capacity hard disk device or the like, stores the phonebook data. The phonebook data may be searched by the phonebook search system, which is an application executed by CPU 401. FIG. 7 illustrates a display example of personal data (personal profile data) searched and retrieved by the phonebook search system. In the present embodiment, the profile shown in FIG. 7 is created in an html file (referred to as profile html) that may appear on the browser. When name column 410 in the profile html is clicked on the browser, a reversed NAPTR query is transmitted to Web server 103.

As shown in FIG. 8, DB 403 stores a user ID and a password that CPU 401 uses for user authentication when the user logs in to the phonebook search system. DB 403 further stores a URI or an IP address corresponding to the user ID for the user of the IP telephone apparatus.

The following describes the operation in the above-described embodiment.

In the following, in the FIG. 1 network configuration, a case is explained wherein the call recipient is specified by the phonebook search system at PC 102 and a call is placed to IP telephone apparatus (B) 110 by clicking the call recipient name on the browser. FIGS. 9, 10, 11 and 12 are referred for the illustration.

Figure 9:
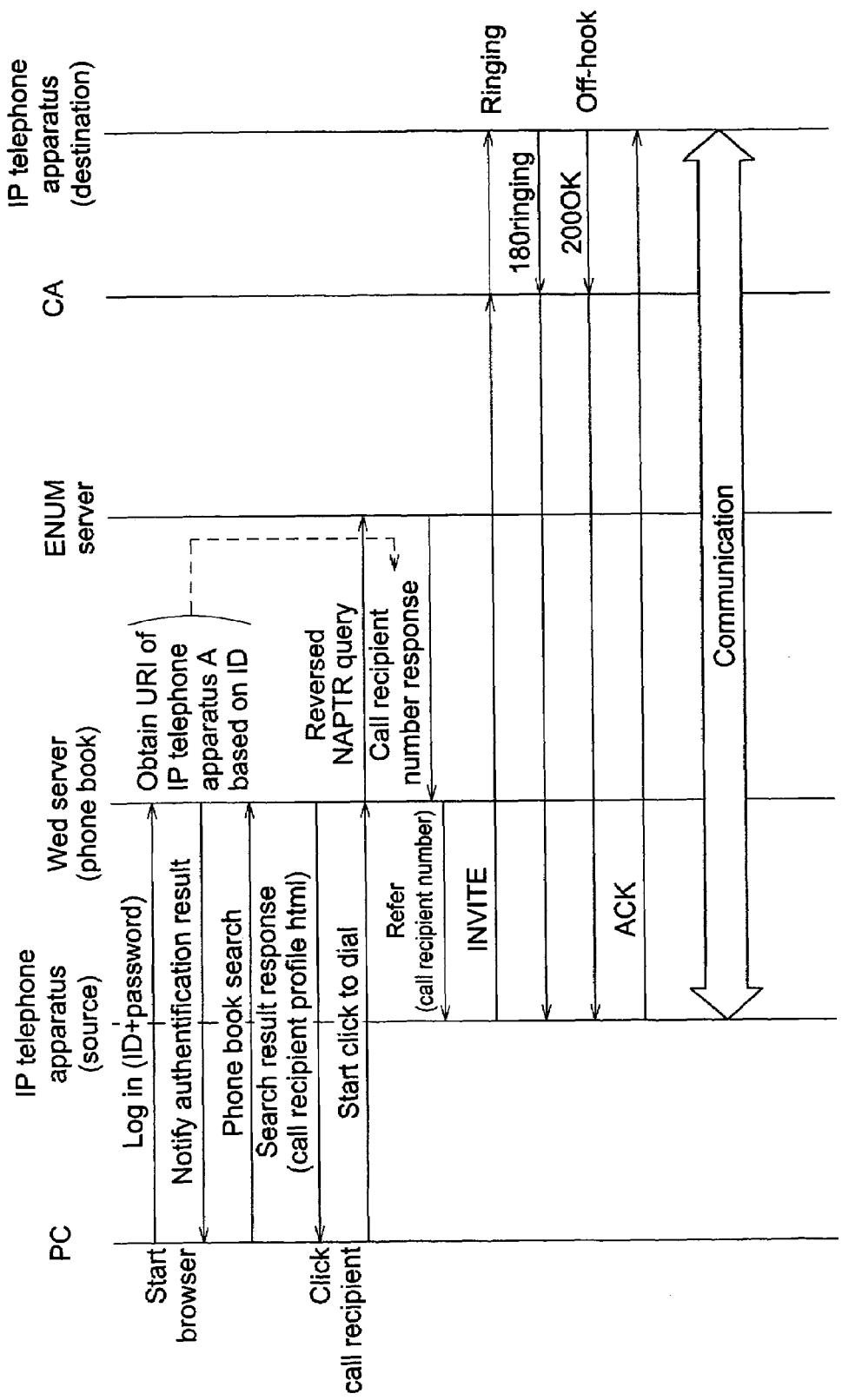
FIG. 9 illustrates a sequence diagram describing operations until a source IP telephone apparatus communicates with a destination IP telephone apparatus in the IP telephone system according to the embodiment.
Figure 10:
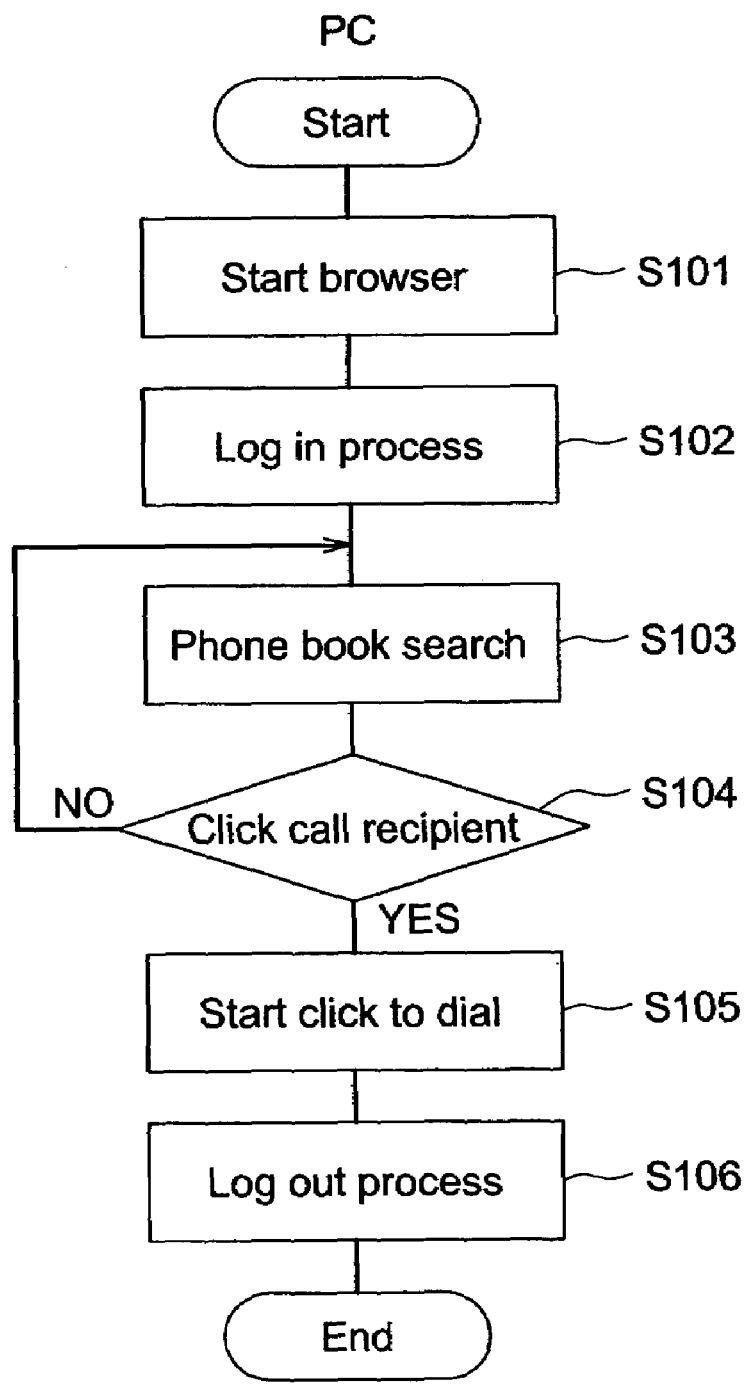
FIG. 10 illustrates a flow chart describing an operation of a PC when a call is made by clicking on the screen.
Figure 11:
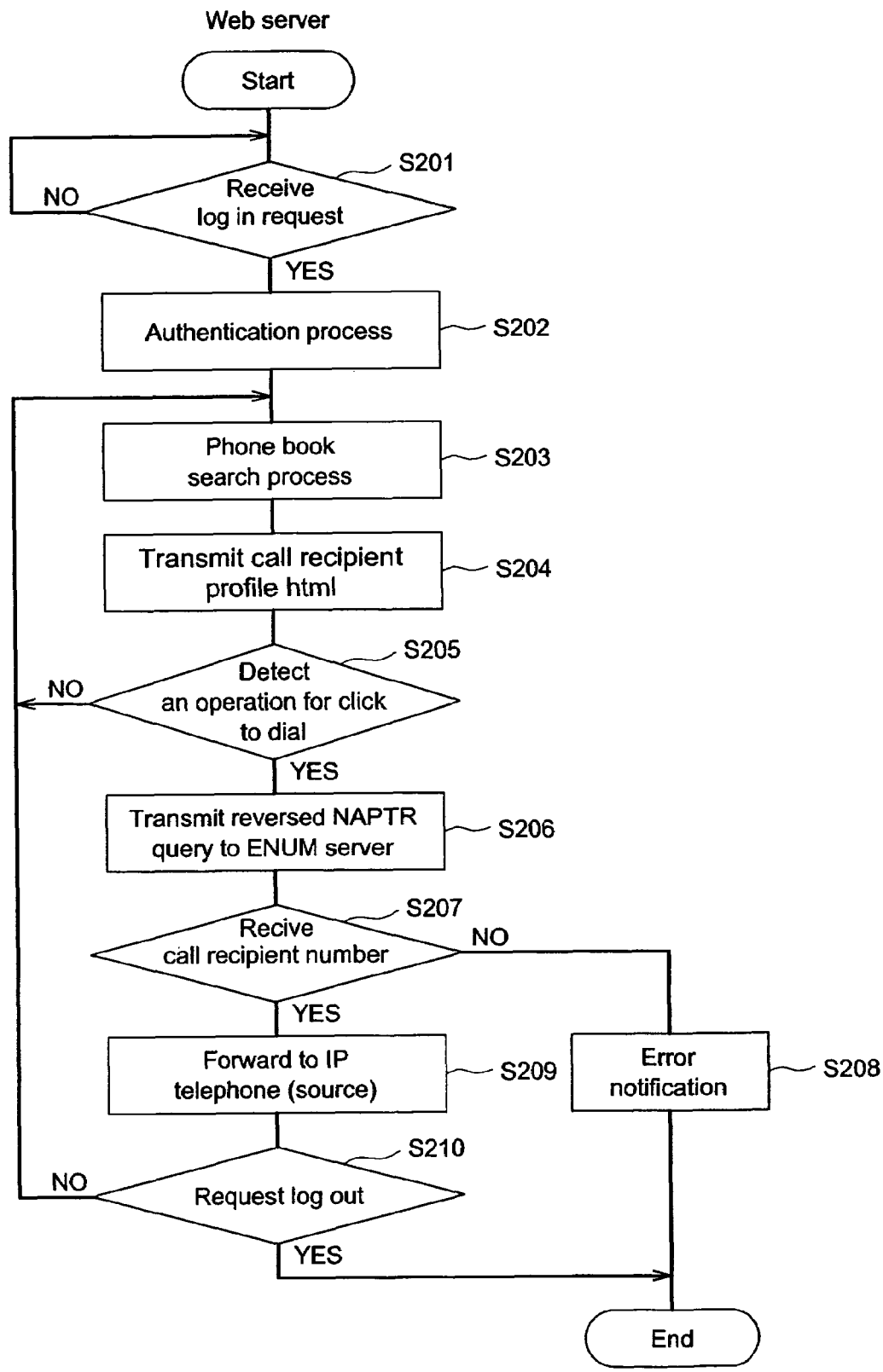
FIG. 11 illustrates a flow chart describing an operation of the Web server when a call is made by clicking on the screen.
Figure 12:
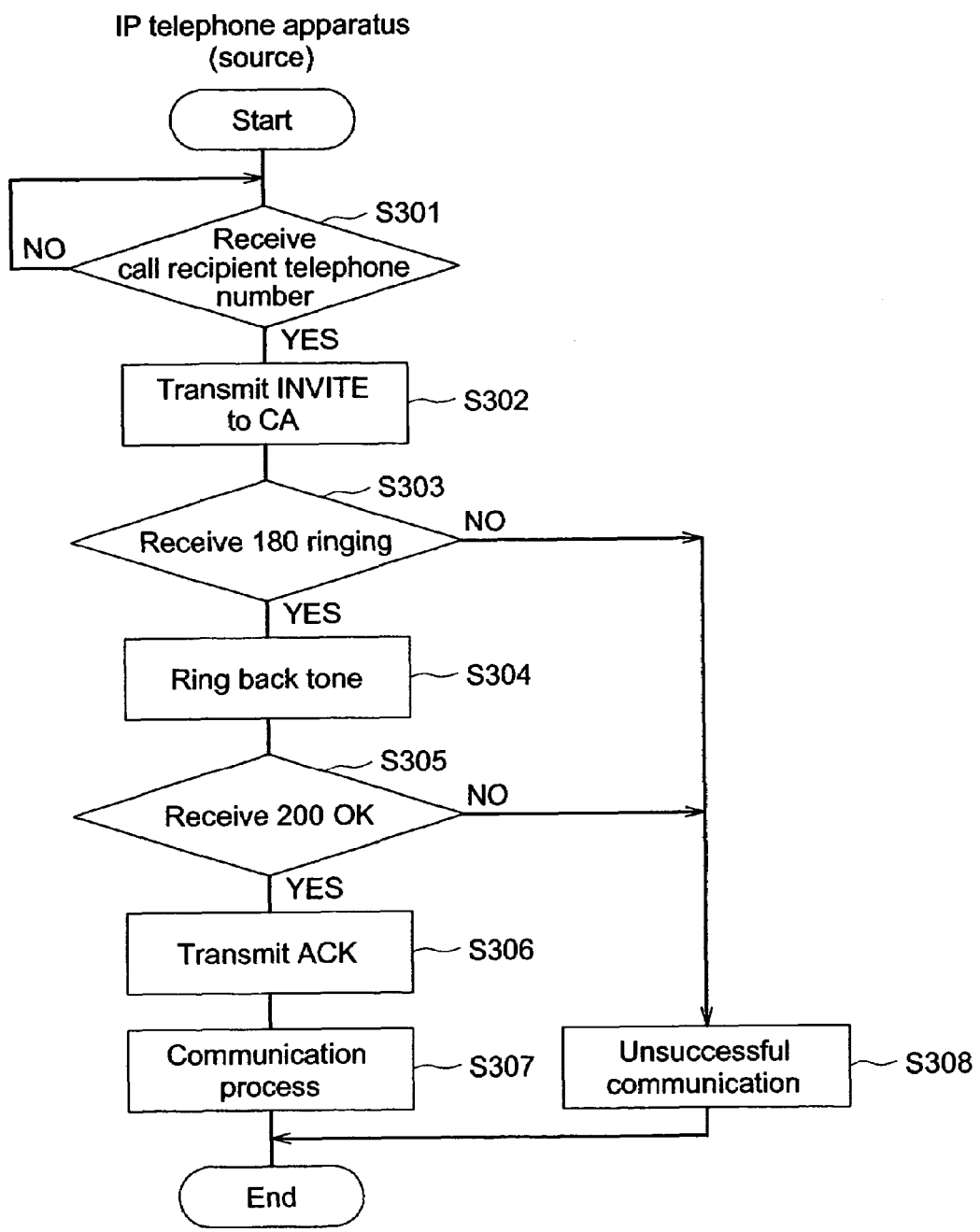
FIG. 12 illustrates a flow chart describing an operation of the source IP telephone apparatus when a call is made by clicking on the screen.

FIG. 9 illustrates a sequence describing operations from when the user logs in to the phonebook search system at PC 102 to when communication starts between IP telephone apparatuses (A) 101 and (B) 110. FIG. 10 illustrates a flow chart for PC 102; FIG. 11 illustrates a flow chart for Web server 103; FIG. 12 illustrates a flow chart for the IP telephone apparatus. First, operations between PC 102 and Web server 103 are described. The user starts the browser at PC 102 and logs in to the Web server 103 phonebook search system.

As shown in FIG. 10, PC 102 starts the browser in accordance with the user's operation (S101) and transmits, to Web server 103, a request for displaying an initial screen of the phonebook search system by using the URI received from Web server 103, the URI being specified by the user. When the user logs in on the initial screen by entering the user ID and password, PC 102 transmits a login request to Web server 103 (S102).

Figure 13:
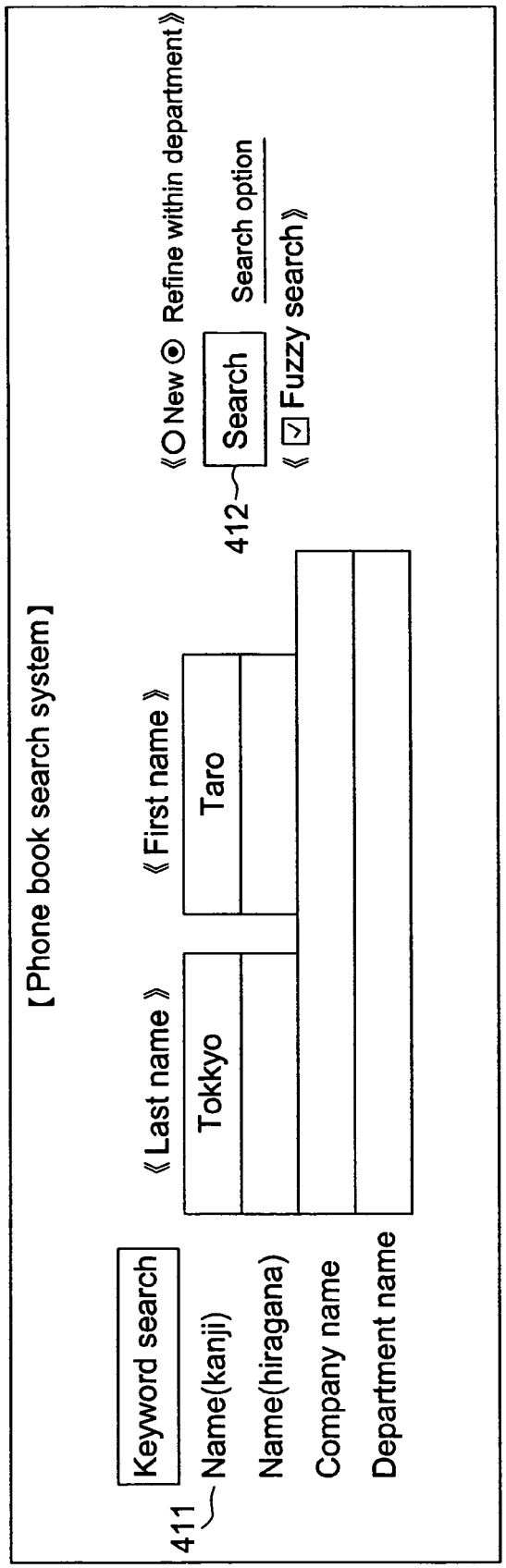
FIG. 13 illustrates a configuration of a phonebook search screen.

As shown in FIG. 11, upon receiving the login request to the phonebook search system (S 201), Web server 103 cross-checks the obtained ID and password with those stored in the phonebook (FIG. 8). When they match, Web server 103 allows the user to login (S 202). Web server 103 transmits, to the client (PC 102) that logged in, a phonebook search screen. FIG. 13 illustrates an example of the phonebook search screen.

The phonebook search screen appears on the browser's window of PC 102 that logged in to the phonebook search system. When entering a search condition in name column 411 provided on the phonebook search screen and clicking search button 412, an advanced search condition is transmitted to Web server 103 (S103).

Web server 103 transmits the advanced search condition to the phonebook system and searches for the corresponding data from the phonebook data (S 203). For example, when the name targeted as the advanced search condition is "Tokkyo Taro", the personal data shown in FIG. 7 is retrieved as a search result. Web server 103 transmits, to PC 102, the call recipient profile html ("//www.tokyo.sip.com./useraaa.html") which displays the personal data shown in FIG. 7 on the browser (S 204). When there are a plurality of corresponding records, a plurality of other parties' htmls are transmitted.

The browser's window of PC 102 displays the call recipient profile, which shows the personal data shown in FIG. 7, based on the call recipient profile html received from Web server 103.

When the user places a call to "Tokkyo Taro", which was retrieved by the phonebook search system, for example, name 410 is clicked, the name which was displayed in the call recipient profile html (S104).

When the call recipient name 410 is clicked, Web server 103 transmits a reversed NAPTR query and a telephone number request, using a CGI (Common Gateway Interface) based on the call recipient profile html information. Web server 103 first transmits, to ENUM server 106, the reversed NAPTR query for the call recipient ENUM domain name based on the call recipient profile html information (S 206).

ENUM server 106 stores, in DB 303, the NAPTR record shown in FIG. 5. When the reversed NAPTR query is received from Web server 103, ENUM server 106, at CPU 301, reversely obtains the call recipient ENUM domain name based on the call recipient profile html included in the request. As an example, ENUM server 106 searches the URI schemes corresponding to the http service, the URI schemes contained in the NAPTR record stored in DB 303. ENUM server 106 then retrieves the NAPTR record specifying, in the URI, the same file name as the call recipient profile html.

Next, ENUM server 106 extracts the telephone number URI (050 system) corresponding to the SIP service (IP telephone) from the NAPTR record (URI) stored in connection with the retrieved call recipient ENUM domain name. In other words, ENUM server 106 extracts all of the URIs or the telephone numbers (050 system) included therein for the call recipient that was clicked on PC 102, the URIs or telephone numbers corresponding to the IP telephone service (sip) stored on ENUM server 106. In the FIG. 5 example, when "Tokkyo Taro" is clicked on the browser, the call recipient ENUM domain name "0.00.0.0.0.0.1.3.1.8.e164.arpa" is reversely obtained from the call recipient profile html "//www.tokyo.sip.com/useraaa.html". After that, URI "05011112222@tokyo.sip.jp" is retrieved, the URI corresponding to the SIP service (IP telephone) and being stored in connection with the call recipient ENUM domain name. Upon receiving the reversed NAPTR query, ENUM server 106 transmits, to Web server 103 that has transmitted the request, telephone number URI "05011112222@tokyo.sip.jp" or only telephone number "05011112222" as the call recipient number response.

Web server 103 then receives the call recipient number response from ENUM server 106 (S 207). When ENUM server 106 does not store the NAPTR record, an error notification is transmitted to ENUM server 106. The error notification is forwarded to PC 102 that has transmitted the request, after which the process is terminated (S 208).

Web server 103 transmits, to the URI (IP address) of the source IP telephone apparatus (A) 101, the URI being confirmed when the user logged in to PC 102, the call recipient telephone number URI, using a refer message (S 209).

PC 102 transmits, to Web server 103, a click-to-dial request when name 410 is clicked on the browser (S105). After that, PC 102 performs an automatic logout process by a timer, or upon the user request (S106). When the logout request is received from the client (S 210), which is PC 102, Web server 103 terminates the process.

After the above-noted steps, the process proceeds to operations performed among the source IP telephone apparatus (A) 101, CA server 108 and the destination IP telephone apparatus (B) 110.

FIG. 12 illustrates a flow chart for the source IP telephone apparatus (A) 101. IP telephone apparatus (A) 101 receives the call recipient telephone number (including a URI containing a telephone number) by the refer message transmitted from Web server 103, which initiates a call process (S 301).

IP telephone apparatus (A) 101 creates the "INVITE" message which includes the call recipient telephone number and the telephone number of IP telephone apparatus (A) 101. The call recipient telephone number was received in S301 as an intended recipient telephone number ("To" field). The telephone number of IP telephone apparatus (A) 101 is specified as the source telephone number ("From" field). IP telephone apparatus (A) 101 then transmits the "INVITE" message to CA 108 (S 302). IP telephone apparatus (A) 101 previously stores an IP address of CA server 108. FIG. 14 illustrates an example of the "INVITE" message.

When receiving the "INVITE" message from IP telephone apparatus (A) 101, CA server 108 confirms the call recipient telephone number ("To" field), and forwards the "INVITE" message to the IP address of IP telephone apparatus (B) 110, which has the call recipient telephone number. In other words, CA server 108 obtains the IP address of IP telephone apparatus (B) 110 having the call recipient telephone number, based on the call recipient telephone number, sets the IP address of IP telephone apparatus (B) 110 as an IP packet destination, and transmits the "INVITE" message to Internet/Intranet 105.

Upon receiving the "INVITE" message, the destination IP telephone apparatus (B) 110 sounds a ring tone and transmits, to CA server 108, the "180 Ringing" message. CA server 108 then forwards the "180 Ringing" message to the source IP telephone apparatuses (A) 101. Upon receiving the "180 Ringing" message (S 303), the source IP apparatus (A) 101 sounds a ring back tone through the speaker of handset 203 (S 304).

In response to the ring back tone, the user, who searched for the call recipient name from the phonebook system at PC 102 and clicked the name, picks up handset 203 of IP telephone apparatus (A) 101 provided close to the user of PC 102, puts the handset 203 to the ear, and hears the ring tone directed to the destination IP telephone apparatus (B) 110.

When an off-hook condition is detected at the destination IP telephone apparatus (B) 110, the destination IP telephone apparatus (B) 110 transmits, to the source IP telephone apparatus (A) 101, the "200 OK" message via CA server 108. Upon receiving the "200 OK" message (S 305), the source IP telephone apparatus (A) 101 transmits the "ACK" message to the destination IP telephone apparatus (B) 110 (S 306), after which communication becomes available (S 307). When an error message is received in S303, it indicates that the communication was unsuccessful (S 308), and the process is terminated.

As described above, in the present embodiment, when the call recipient name is clicked on the search result screen of the phonebook search system, the html file name displaying the call recipient profile (personal data) is transmitted to ENUM server 106. ENUM server 106 then extracts the URI corresponding to the call recipient IP telephone service from the NAPTR record based on the html file name, and transmits the URI to IP telephone apparatus (A) 101. Therefore, the user becomes able to place a call to the destination IP telephone apparatus (B) 110 without entering the call recipient telephone number at IP telephone apparatus (A) 101.

In addition, in the above-described embodiment, CA server 108 is involved until a connection is established between the source IP telephone apparatus (A) 101 and the destination IP telephone apparatus (B) 110. It is also possible, however, to establish a connection by performing a call control directly between IP telephone apparatuses (A) 101 and (B) 110 without involving CA server 108.

Figure 15:
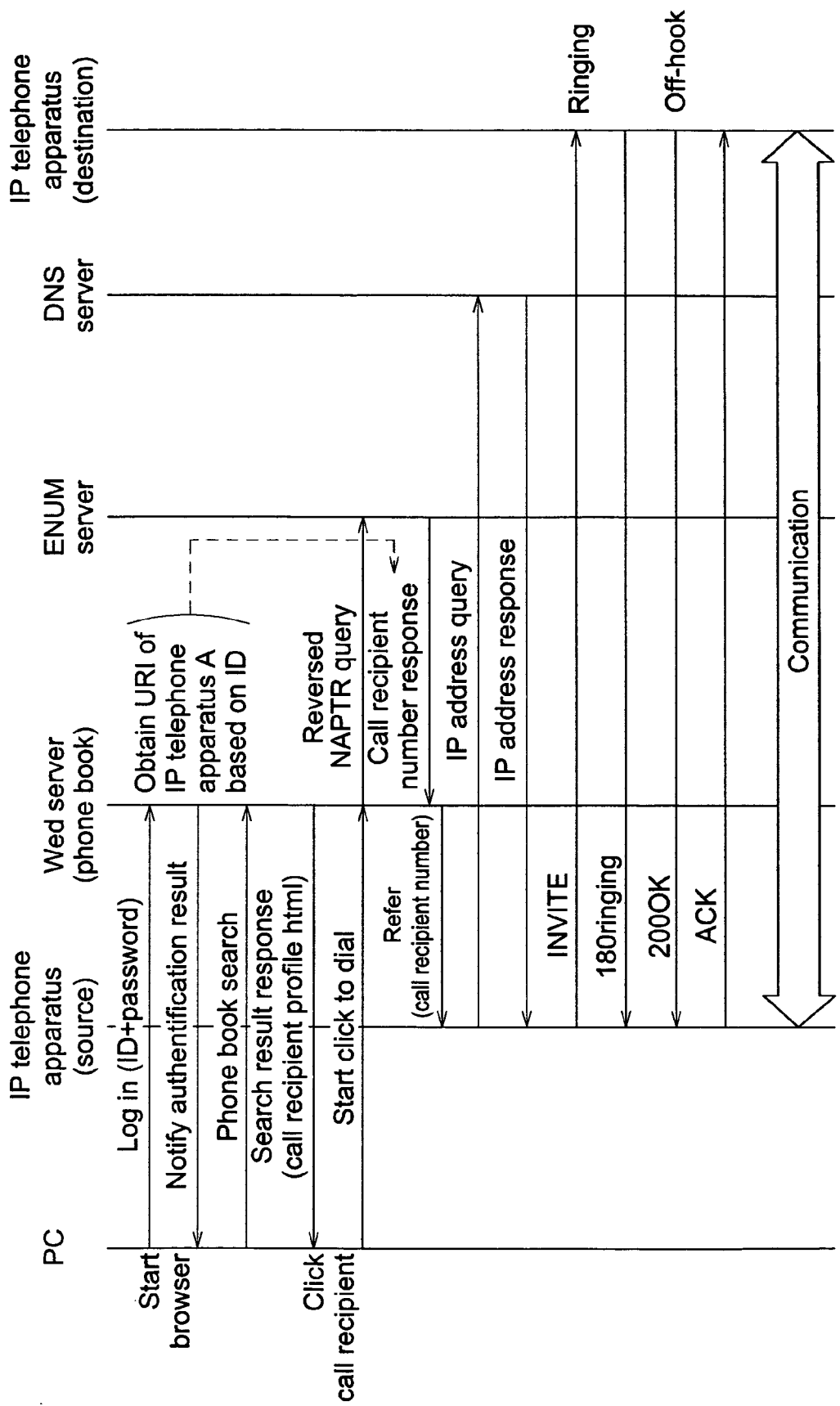
FIG. 15 illustrates a sequence diagram describing operations until the source IP telephone apparatus communicates with the destination IP telephone apparatus without involving a CA server.

FIG. 15 illustrates a sequence describing a call control directly performed between IP telephone apparatuses (A) 101 and (B) 110 without involving CA server 108. FIG. 15 shows a case where Web server 103 transmits, to the URI (IP address) of the source IP telephone apparatus (A) 101, the URI being confirmed when the user logged in to PC 102, the call recipient telephone number URI, using the refer message.

Upon receiving, from Web server 103, the call recipient telephone number URI, the source IP telephone apparatus (A) 101 starts a process for obtaining the IP address of the destination IP telephone apparatus (B) 110 based on the domain name corresponding to the URI. More specifically, the source IP telephone apparatus (A) 101 transmits, to DNS server 107, a request for the IP address by specifying the domain name. DNS server 107 has a function which obtains the IP address of the corresponding terminal (IP telephone apparatus (B) 110) based on the domain name. DNS server 107 transmits, to IP telephone apparatus (A) 101, the obtained IP address of IP telephone apparatus (B) 110. The source IP telephone apparatus (A) 101 then directly transmits, to the destination IP telephone apparatus (B) 110, the "INVITE" message, using the obtained IP address, via Internet/Intranet 105. The "INVITE" message is structured as shown in FIG. 14. Communication then starts after the direct exchange of the messages "180 Ringing", "200 OK" and "ACK" between the source and destination IP telephone apparatuses.

In the above description, the user at the transmitting side accesses the phonebook search system and clicks the call recipient name at PC 102. It is also possible, however, to have the source IP telephone apparatus (A) 101 perform all operations, the operations initiated by starting the browse at PC 102. In other words, it is possible to perform the operation of PC 102 shown in FIG. 10 at IP telephone apparatus (A) 101. In this case, the process does not require Web server 103.

Instead of displaying personal data for only one individual as show in FIG. 7, it is further possible to display personal data for a plurality of parties, to click on the selected party, and to transmit to ENUM server 106 a request for a reversed NAPTR search as well as a telephone number request by specifying the call recipient profile file html for the party that was clicked. In addition, personal data stored on Web server 103 is not limited to phonebook data, but may take the form of other types of data as well. It is also possible to display all of the personal data or part of the data on PC 102.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-228655 filed on Aug. 4, 2004 entire content of which is expressly incorporated by reference herein.

What is claimed is:

1. A method for making a call using an IP telephone apparatus, the IP telephone apparatus being connected to a terminal apparatus and a Web server, the Web server storing predetermined information regarding a predetermined user of another IP telephone apparatus, the predetermined information corresponding to a HTML address, the Web server further storing an IP address of the IP telephone apparatus corresponding to ID information of a user of the terminal apparatus, the IP telephone apparatus being connected to an ENUM server, the ENUM server storing a NAPTR (Naming Authority Pointer) resource record, the NAPTR resource record including an ENUM domain name corresponding to first information and second information, the first information being associated with the HTML address, the second information being associated with a telephone number of the another IP telephone apparatus, the method comprising:

accessing, at the terminal apparatus, the Web server to search for the predetermined information regarding the predetermined user of the another IP telephone apparatus, using the ID information of the user of the terminal apparatus;

receiving, at the terminal apparatus from the Web server, a search result, the search result including the predetermined information regarding the predetermined user of the another IP telephone apparatus;

selecting, at the terminal apparatus, the predetermined information regarding the predetermined user of the another IP telephone apparatus contained in the received search result;

notifying, from the terminal apparatus to the Web server, that the predetermined information regarding the predetermined user of the another IP telephone apparatus is selected at the terminal apparatus;

transmitting, from the Web server to the ENUM server, a request for the telephone number of the another IP telephone apparatus, based on the HTML address corresponding to the selected predetermined information regarding the predetermined user of the another IP telephone apparatus;

searching, at the ENUM server, for the NAPTR resource record including the first information associated with the HTML address, the NAPTR resource record including the second information corresponding to the first information, the second information being associated with the telephone number of the another IP telephone apparatus;

transmitting, from the ENUM server to the Web server, the telephone number of the another IP telephone apparatus;

transmitting, from the Web server to the IP telephone apparatus, the telephone number of the another IP telephone apparatus, based on the IP address of the IP telephone apparatus, the IP address of the IP telephone apparatus corresponding to the ID information of the user of the terminal apparatus; and accessing, at the IP telephone apparatus, the another IP telephone apparatus to make a call via the Internet, based on the received telephone number of the another IP telephone apparatus.

2. The method according to claim 1, wherein the predetermined information regarding the predetermined user comprises one of a name of the predetermined user, an address of the predetermined user and an e-mail address of the predetermined user.

3. The method according to claim 1 further comprising a DNS server configured to store an IP address of the another IP telephone apparatus corresponding to the telephone number of the another IP telephone apparatus, wherein the accessing the another IP telephone apparatus comprises receiving, from the DNS server, the IP address of the another IP telephone apparatus corresponding to the telephone number of the another IP telephone apparatus and accessing the another IP telephone apparatus to make a call via the Internet, based on the received IP address of the another IP telephone apparatus.

4. A method for making a call using an IP telephone apparatus, the IP telephone apparatus being connected to a Web server, the Web server storing predetermined information regarding a predetermined user of another IP telephone apparatus, the predetermined information corresponding to a HTML address, the IP telephone apparatus being connected to an ENUM server, the ENUM server storing a NAPTR (Naming Authority Pointer) resource record, the NAPTR resource record including an ENUM domain name corresponding to first information and second information, the first information being associated with the HTML address, the second information being associated with a telephone number of the another IP telephone apparatus, the method comprising:

accessing, at the IP telephone apparatus, the Web server to search for the predetermined information regarding the predetermined user of the another IP telephone apparatus;

receiving, at IP telephone apparatus from the Web server, a search result, the search result including the predetermined information regarding the predetermined user of the another IP telephone apparatus;

selecting, at the IP telephone apparatus, the predetermined information regarding the predetermined user of the another IP telephone apparatus contained in the received search result;

notifying, from the IP telephone apparatus to the Web server, that the predetermined information regarding the predetermined user of the another IP telephone apparatus is selected at the IP telephone apparatus;

transmitting, from the Web server to the ENUM server, a request for the telephone number of the another IP telephone apparatus, based on the HTML address corresponding to the selected predetermined information regarding the predetermined user of the another IP telephone apparatus;

searching, at the ENUM server, for the NAPTR resource record including the first information associated with the HTML address, the NAPTR resource record including the second information corresponding to the first information, the second information being associated with the telephone number of the another IP telephone apparatus;

transmitting, from the ENUM server to the Web server, the telephone number of the another IP telephone apparatus;

transmitting, from the Web server to the IP telephone apparatus, the telephone number of the another IP telephone apparatus; and accessing, at the IP telephone apparatus, the another IP telephone apparatus to make a call via the Internet, based on the received telephone number of the another IP telephone apparatus.

5. An IP telephone system comprising:

an IP telephone apparatus;

a terminal apparatus;

a Web server configured to store predetermined information regarding a predetermined user of another IP telephone apparatus, the predetermined information corresponding to a HTML address and to store an IP address of the IP telephone apparatus corresponding to ID information of a user of the terminal apparatus; and an ENUM server configured to store a NAPTR (Naming Authority Pointer) resource record, the NAPTR resource record including an ENUM domain name corresponding to first information and second information, the first information being associated with the HTML address, the second information being associated with a telephone number of the another IP telephone apparatus, the terminal apparatus being further configured to:

access the Web server to search for the predetermined information regarding the predetermined user of the another IP telephone apparatus, using the ID information of the user of the terminal apparatus;

receive, from the Web server, a search result, the search result including the predetermined information regarding the predetermined user of the another IP telephone apparatus;

select the predetermined information regarding the predetermined user of the another IP telephone apparatus contained in the received search result; and notify the Web server that the predetermined information regarding the predetermined user of the another IP telephone apparatus is selected at the terminal apparatus, the Web server being further configured to:

transmit, to the ENUM server, a request for the telephone number of the another IP telephone apparatus, based on the HTML address corresponding to the selected predetermined information regarding the predetermined user of the another IP telephone apparatus, the ENUM server searching for the NAPTR resource record including the first information associated with the HTML address, the NAPTR resource record including the second information corresponding to the first information, the second information being associated with the telephone number of the another IP telephone apparatus;

receive, from the ENUM server, the telephone number of the another IP telephone apparatus; and transmit, to the IP telephone apparatus, the telephone number of the another IP telephone apparatus, based on the IP address of the IP telephone apparatus, the IP address of the IP telephone apparatus corresponding to the ID information of the user of the terminal apparatus, the IP telephone apparatus being further configured to access the another IP telephone apparatus to make a call via the Internet, based on the received telephone number of the another IP telephone apparatus.

6. The IP telephone system according to claim 5, wherein the predetermined information regarding the predetermined user comprises one of a name of the predetermined user, an address of the predetermined user and an e-mail address of the predetermined user.

7. The IP telephone system according to claim 5, wherein the terminal apparatus searches for the predetermined information regarding the predetermined user by using a keyword, and receives, from the Web server, the predetermined information corresponding to the keyword.

8. The IP telephone system according to claim 5, wherein, when the ENUM server receives the request for the telephone number of the another IP telephone apparatus, the ENUM server searches in the NAPTR resource record for an ENUM domain name corresponding to the first information, searches in the NAPTR resource record for the second information corresponding to the ENUM domain name, and transmits, to the Web server, the telephone number of the another IP telephone apparatus included in the second information.

* * * * *